(12) United States Patent
Moore

(10) Patent No.: US 8,181,980 B1
(45) Date of Patent: May 22, 2012

(54) UNCOMPLICATED BICYCLE DEVICE FOR FASTENING A STEERING TUBE WITH A STEM TUBE

(75) Inventor: Wayne-Ian Moore, Hanghua County (TW)

(73) Assignee: Ashima Ltd., Changhua (TW)

( * ) Notice: Subject to any disclaimer, the term of this patent is extended or adjusted under 35 U.S.C. 154(b) by 0 days.

(21) Appl. No.: 13/159,432

(22) Filed: Jun. 14, 2011

(51) Int. Cl.
*B62K 21/00* (2006.01)
(52) U.S. Cl. .......................... 280/279; 280/276; 280/280
(58) Field of Classification Search .................. 280/276, 280/277, 279, 280
See application file for complete search history.

(56) References Cited

U.S. PATENT DOCUMENTS

| 7,896,380 B2 * | 3/2011 | Tange | 280/279 |
| 8,052,346 B2 * | 11/2011 | Lin | 403/118 |

* cited by examiner

*Primary Examiner* — Tony H. Winner
*Assistant Examiner* — Marc Scharich

(57) ABSTRACT

An uncomplicated bicycle device for fastening a steering tube with a stem tube includes two compression rings and a fastening set. The compression ring is fixed on a stem opening by inserting the lateral surface portion into the stem tube and the protruding portion abutted against the stem opening. The steering tube is inserted into the compression rings. A fastening set includes a star nut placed into the steering tube, a cap covering the stem opening and abutted against the compression ring, a cap bolt for screwing the cap and the star nut together. The present invention only uses the compression rings and the fastening set instead of any thread structure and lock nuts for fastening the steering tube within the stem tube. Thus, the adjuster can quickly calibrate and assemble the steering tube within the stem tube again.

3 Claims, 5 Drawing Sheets

UNCOMPLICATED BICYCLE DEVICE FOR FASTENING A STEERING TUBE WITH A STEM TUBE

BACKGROUND OF THE INVENTION

1. Field of the Invention

The present invention relates to a bicycle device for fastening a steering tube with a stem tube and more particularly to an uncomplicated bicycle device for fastening a steering tube with a stem tube.

2. Description of Related Art

Bicycle activity is more and more popular in the 21st century because bicycle activity is eco-friendly, convenient and entertaining. Many enterprises encourage their employees to go to work by bicycles instead of driving vehicles today. Many people also go shopping or go traveling by bicycles during their leisure time. Therefore, bicycle safety becomes an important topic when bicycle manufacturers design and produce bicycles.

A conventional bicycle device for fastening a steering tube with a stem tube includes a plurality of locknuts and a fastening set. The locknuts are screwed along a plurality of thread structures formed on the stem tube for clamping the steering tube tightly. The fastening set further comprises a star nut placed into the steering tube, a cap covering a top of the stem tube, and a cap bolt screwing the star nut and the cap together. After tightening the cap bolt in the cap and the star nut, the star nut is driven down into the steering tube that acts as an anchor by gripping the inside of the steering tube with a downward force. Thus, the stem tube connects to the steering tube tightly and an orientation of the stem tube is as identical as a moving direction of the bicycle which is controlled by a front circle positioned along the steering tube.

However, after a rider rides on the road for a period of time, the locknut and the cap bolt become more and more unfastened because of some vibration, impact and shock in traffic. Therefore, the stem tube can rotate around the steering tube gradually and the orientation of the stem tube is not identical with the moving direction. The orientation of the stem tube needs to be calibrated again. During the calibration:

First, release the cap bolt from the cap for taking the cap away;

Second, release the locknuts for adjusting the stem tube to the identical orientation with the front circle and the steering tube;

Third, assemble the cap, cap bolt and the locknuts again for fastening the steering tube and the stem tube infirmly;

Fourth, rotate a handlebar for checking that the orientations of the stem tube and the front circle are identical or not. If both orientations are not identical, repeat the third until both orientations are identical;

Finally, tighten the cap bolt and the locknuts.

There are at least five steps for calibration in the conventional art because of a multiplicity of components.

The present invention has arisen to mitigate and/or obviate the disadvantages of the conventional.

SUMMARY OF THE INVENTION

The main objective of the present invention is to provide an improved bicycle device for fastening a steering tube with a stem tube.

To achieve the objective, an uncomplicated bicycle device for fastening a steering tube with a stem tube comprises two compression rings, each of the compression rings having a lateral surface portion at one end and a protruding portion at another end thereof, an adjusting gap opened on the compression ring and across the lateral surface portion and the protruding portion, the compression ring being fixed on a stem opening by inserting the lateral surface portion into the stem tube and the protruding portion abutted against the stem opening, the steering tube being inserted into the compression ring, a fastening set further comprising a star nut placed into the steering tube, a cap covering the stem opening and abutted against the compression ring, a cap bolt for screwing the cap and the star nut together, a downward screwing force from the cap bolt fastening the steering tube stably within the stem tube and making the cap cover the compressing ring completely, the adjusting gap obliquely opened on the compression ring, the lateral surface portion being extended vertically from an inner circle of the protruding portion and the lateral surface portion formed as a hollow cylinder, or the lateral surface portion being extended inward obliquely from the inner circle of the protruding portion and the lateral surface portion formed as a hollow cone.

Further benefits and advantages of the present invention will become apparent after a careful reading of the detailed description with appropriate reference to the accompanying drawings.

DETAILED DESCRIPTION OF THE INVENTION

Figure 1:
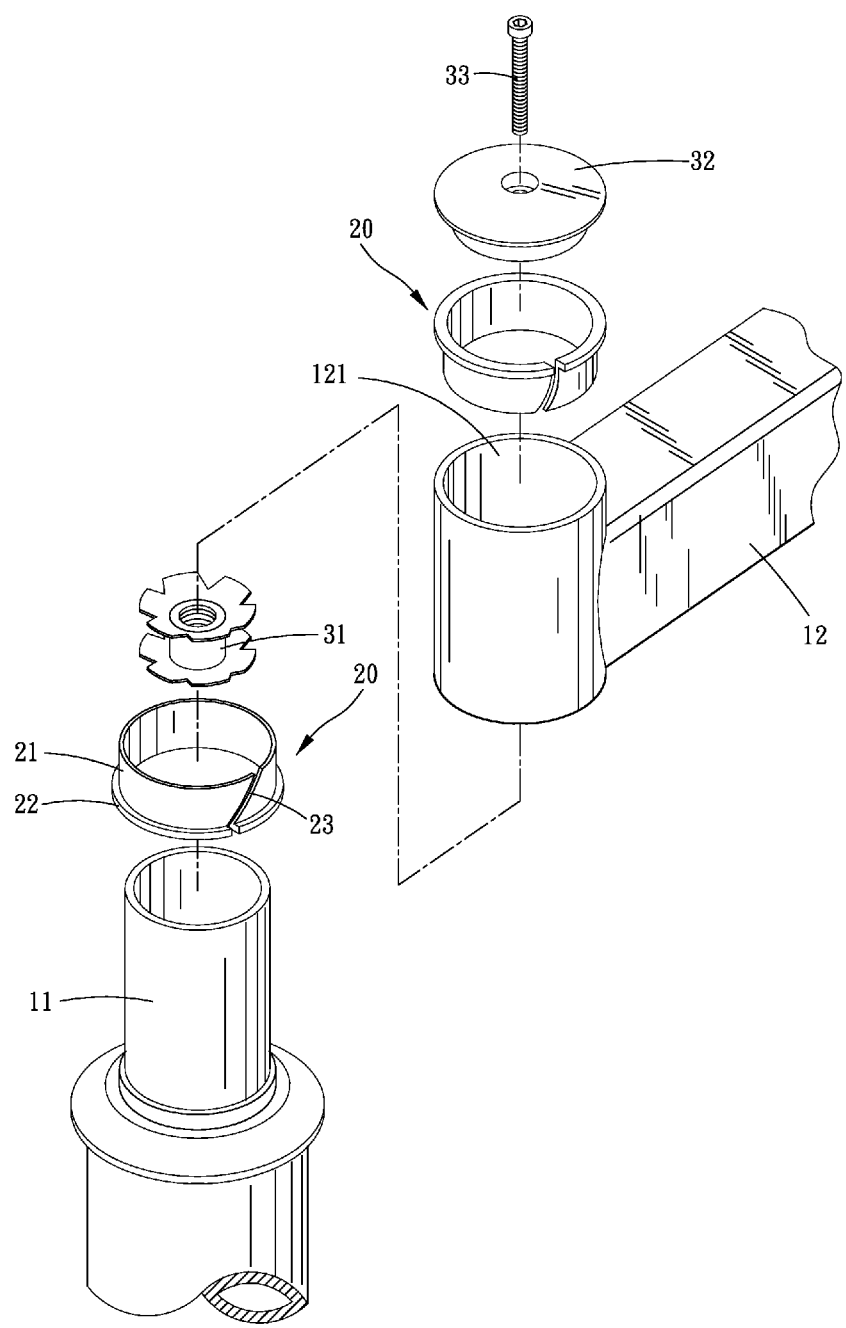
FIG. 1 is an exploded view of an uncomplicated bicycle device for fastening a steering tube with a stem tube of the present invention.
Figure 2:
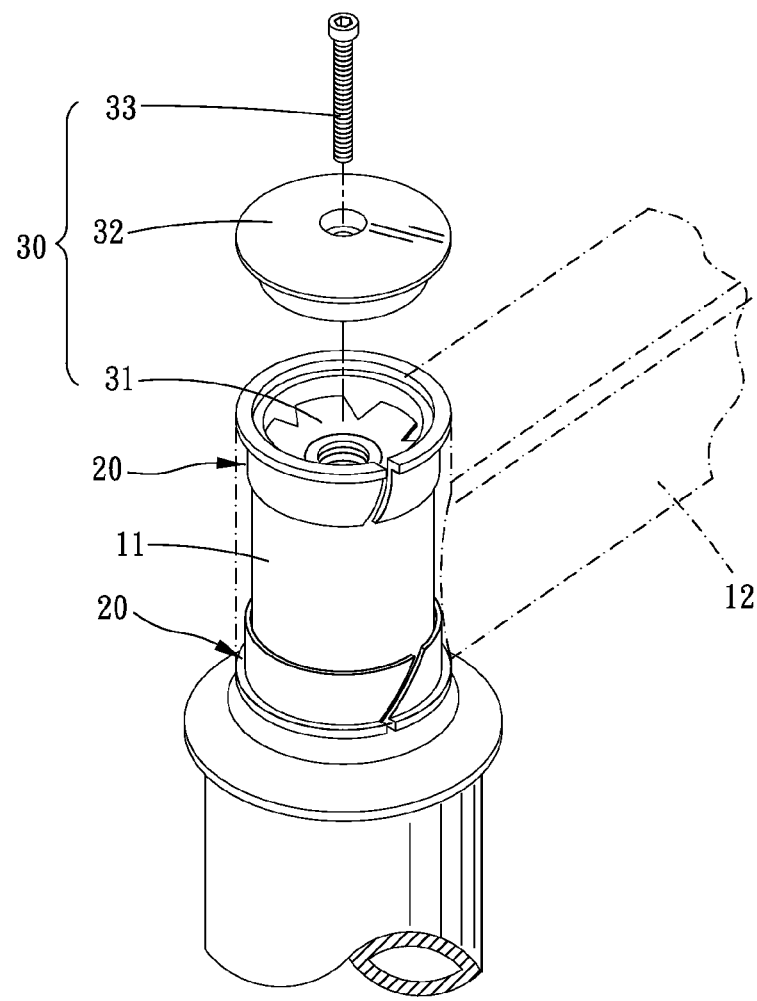
FIG. 2 is a partial exploded view of the uncomplicated bicycle device for fastening a steering tube with a stem tube of the present invention.
Figure 3:
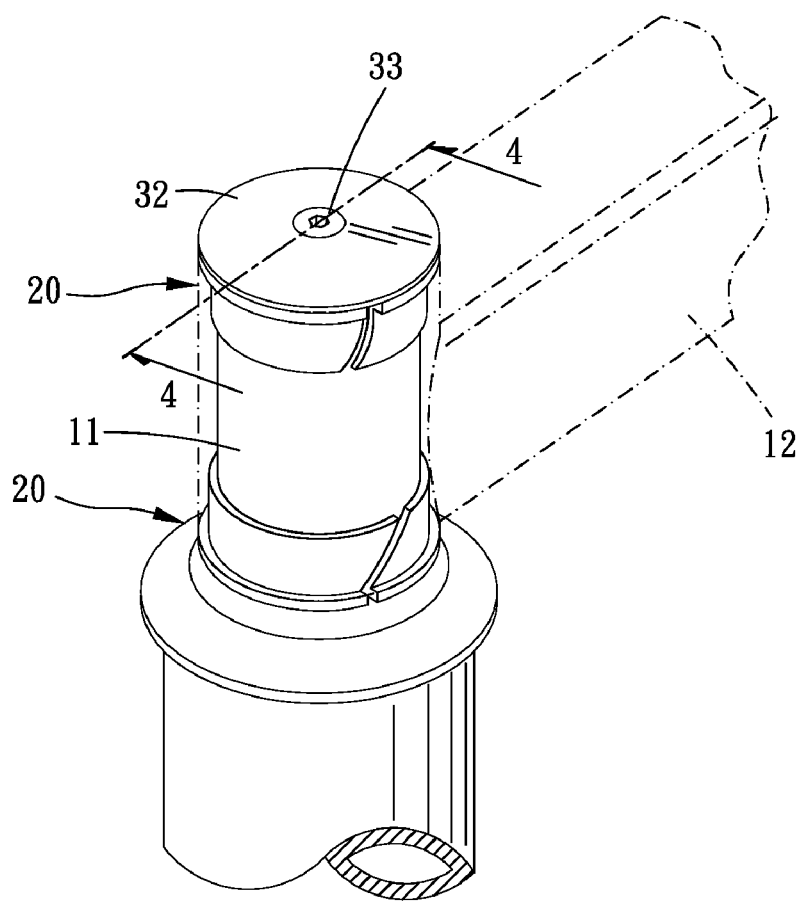
FIG. 3 is an assembled view of the uncomplicated bicycle device for fastening a steering tube with a stem tube of the present invention.
Figure 4:
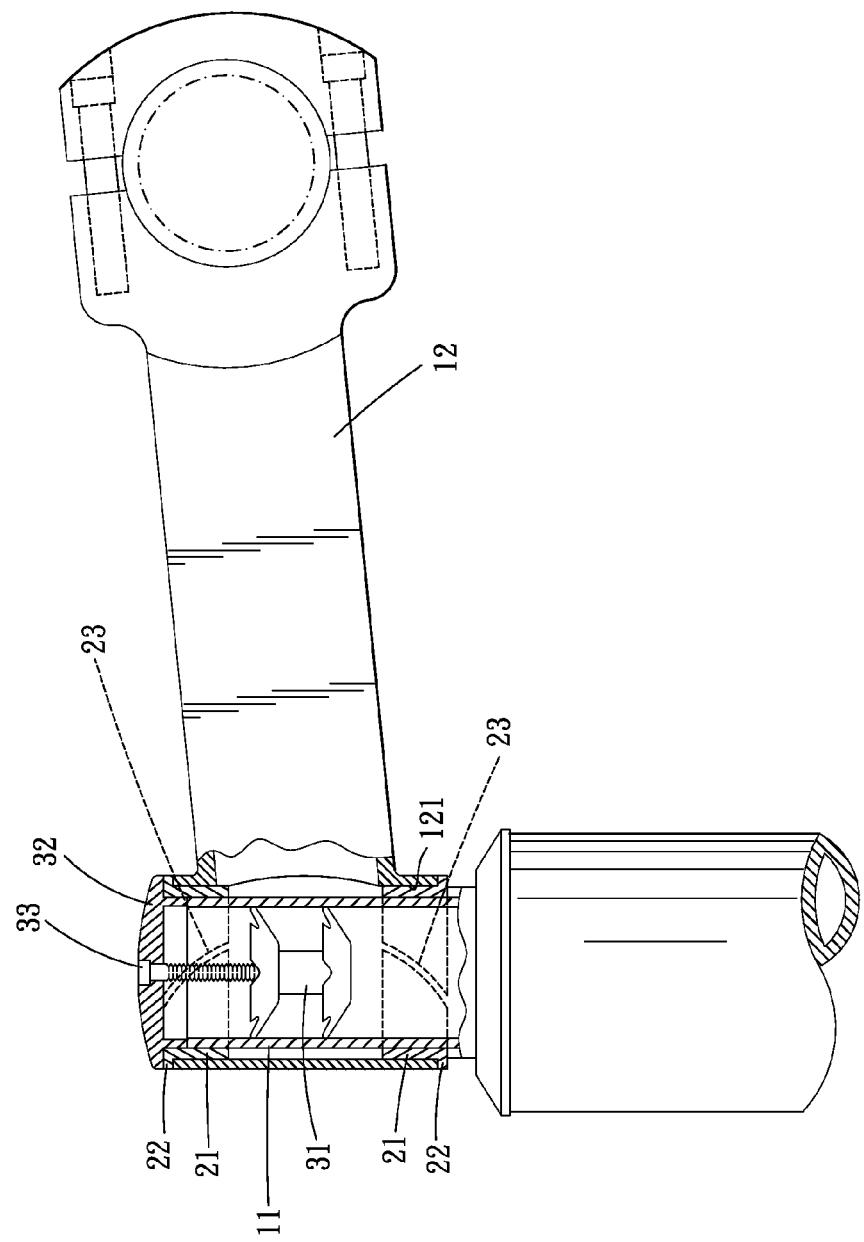
FIG. 4 is a cross-sectional view of the uncomplicated bicycle device for fastening a steering tube with a stem tub along a line 44 shown in FIG. 3.

Referring to the drawings to FIGS. 1-3, an uncomplicated bicycle device for fastening a steering tube 11 with a stem tube 12 in accordance with the present invention comprises two compression rings 20 and a fastening set 30. The compression ring 20 has a lateral surface portion 21 at one end and a protruding portion 22 at another end thereof. An adjusting gap 23 is opened obliquely on the compression ring 20 and across the lateral surface portion 21 and the protruding portion 22. The compression ring 20 is fixed on a stem opening 121 by inserting the lateral surface portion 21 into the stem tube 12 and the protruding portion 22 abutted against the stem opening 121. The steering tube 11 is inserted into the compression ring 20.

The fastening set 30 further comprises a star nut 31 placed into the steering tube 11, a cap 32 covering the stem opening 121 and abutted against the compression ring 20, and a cap bolt 33 for screwing the cap 32 and the star nut 31 together.

Referring to the drawings to FIGS. 1-4, the detail of the assembling is as following, the star nut 31 is placed into the steering tube 11 at first so that the star nut 31 anchors an inner surface of the steering tube 11 tightly. The compression ring 20 is fixed on the stem opening 121 by inserting the lateral surface portion 21 into the stem tube 12. In addition, the steering tube 11 is inserted into the compression ring 20 and surrounded by the lateral surface portion 21. Consequently, the adjusting gap 23 is decreased by an inner wall of the stem tube 12 compressing the compression ring 20, and the steering tube 11 is fastened within the stem tube 12 by compressing the compression ring 20. The cap 32 is covering the stem opening 121 and abutted against the compression ring 20. Finally, the cap bolt 33 screws downward to combine the cap 32 with the star nut 31 tightly, and a downward screwing force not only increases an anchor force of the star nut 31 for fastening the steering tube 11 stably within the stem tube 12, but makes the cap 32 cover the compression ring 20 completely.

When the present invention is under calibration, an adjuster only needs to loose the cap bolt 33 so that the cap 32 is not forcing downward to the compression ring 20, then the adjuster can rotate the stem tube 12 relative to the compression ring 20 for positioning the stem tube 12 at one exact orientation. Finally, the adjuster tightens the cap bolt 33 again so that the cap 32 covers the compression ring 20 completely, and the calibration is finished.

The present invention only uses the compression rings 20 and the fastening set 30 instead of any thread structure and locknuts for fastening the steering tube 11 within the stem tube 12. Thus, the adjuster can quickly calibrate and assemble the steering tube 11 within the stem tube 12 again.

Figure 5:
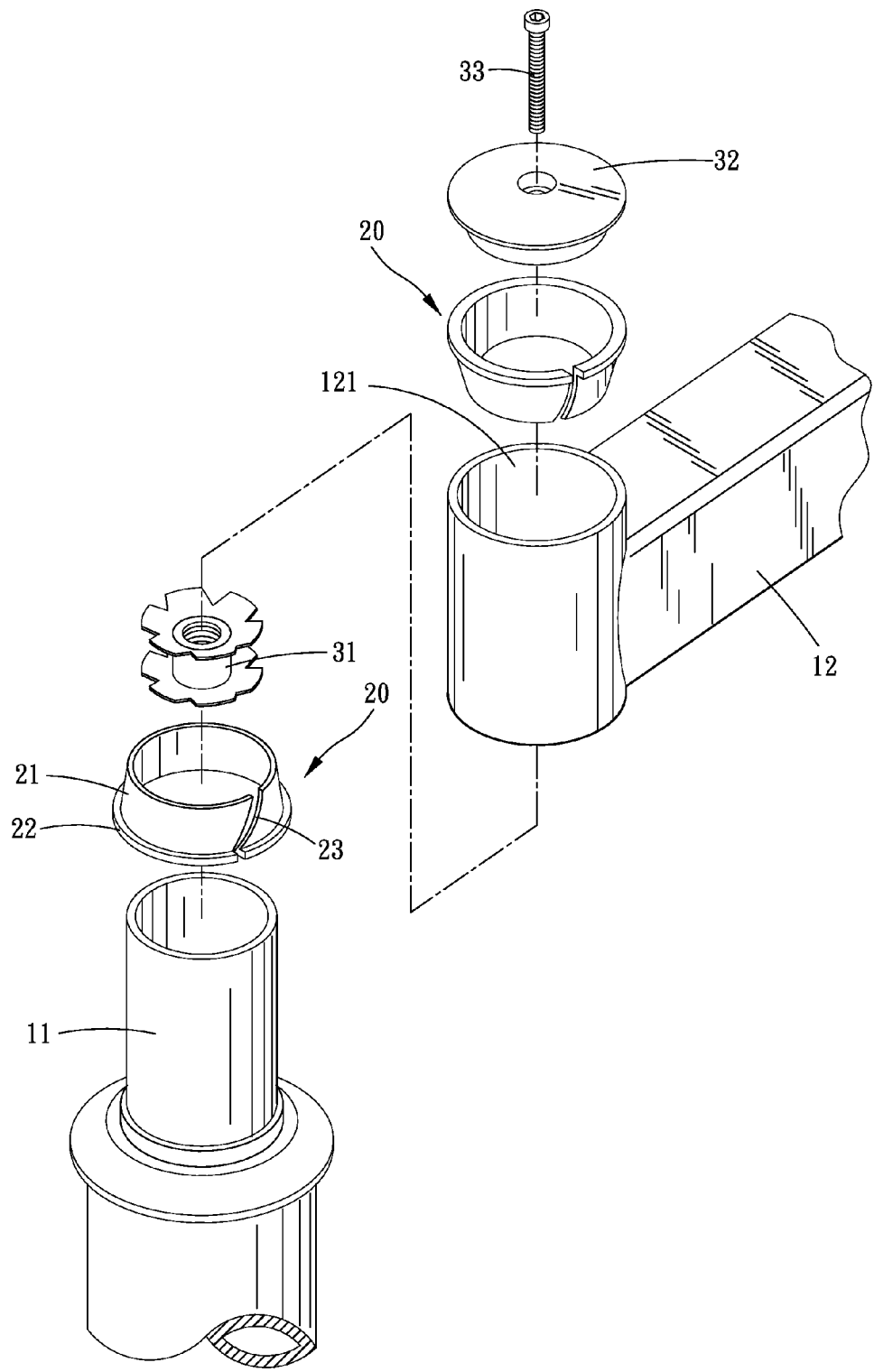
FIG. 5 is another exploded view of another embodiment of the resent invention for showing two cone-shaped compression rings.

Furthermore, the lateral surface portion 21 is extended vertically from an inner circle of the protruding portion 22 and the lateral surface portion is formed as a hollow cylinder. In a second embodiment of the present invention, the lateral surface portion 21 is extended inward obliquely from the inner circle of the protruding portion 22 and the lateral surface portion is formed as a hollow cone (As shown in FIG. 5).

Although the invention has been explained in relation to its preferred embodiment, it is to be understood that many other possible modifications and variations can be made without departing from the spirit and scope of the invention as hereinafter claimed.

What is claimed is:

1. A bicycle device for fastening a steering tube with a stem tube comprising:

two compression rings, each of the compression rings having a lateral surface portion at one end and a protruding portion at another end thereof, an adjusting gap obliquely opened on the compression ring and across the lateral surface portion and the protruding portion, each compression ring being fixed on a stem opening of the stem tube by inserting the lateral surface portion into the stem tube and abutting the protruding portion against the stem opening, the steering tube being inserted into the compression rings; and a fastening set comprising a star nut placed into the steering tube, a cap covering the stem opening and abutted against one of the compression rings, a cap bolt for screwing the cap and the star nut together, wherein a downward screwing force from the cap bolt fastens the steering tube stably within the stem tube and causes the cap to completely cover the compression ring.

2. The bicycle device for fastening a steering tube with a stem tube as claimed in claim 1, wherein the lateral surface portion is extended vertically from an inner circle of the protruding portion and the lateral surface portion is formed as a hollow cylinder.

3. The bicycle device for fastening a steering tube with a stem tube as claimed in claim 1, wherein the lateral surface portion is extended inward obliquely from an inner circle of the protruding portion and the lateral surface portion is formed as a hollow cone.

\* \* \* \* \*